Dec. 15, 1953   W. VAN GUILDER   2,662,421
FOOD MIXER CASING
Original Filed Jan. 3, 1950   3 Sheets-Sheet 3
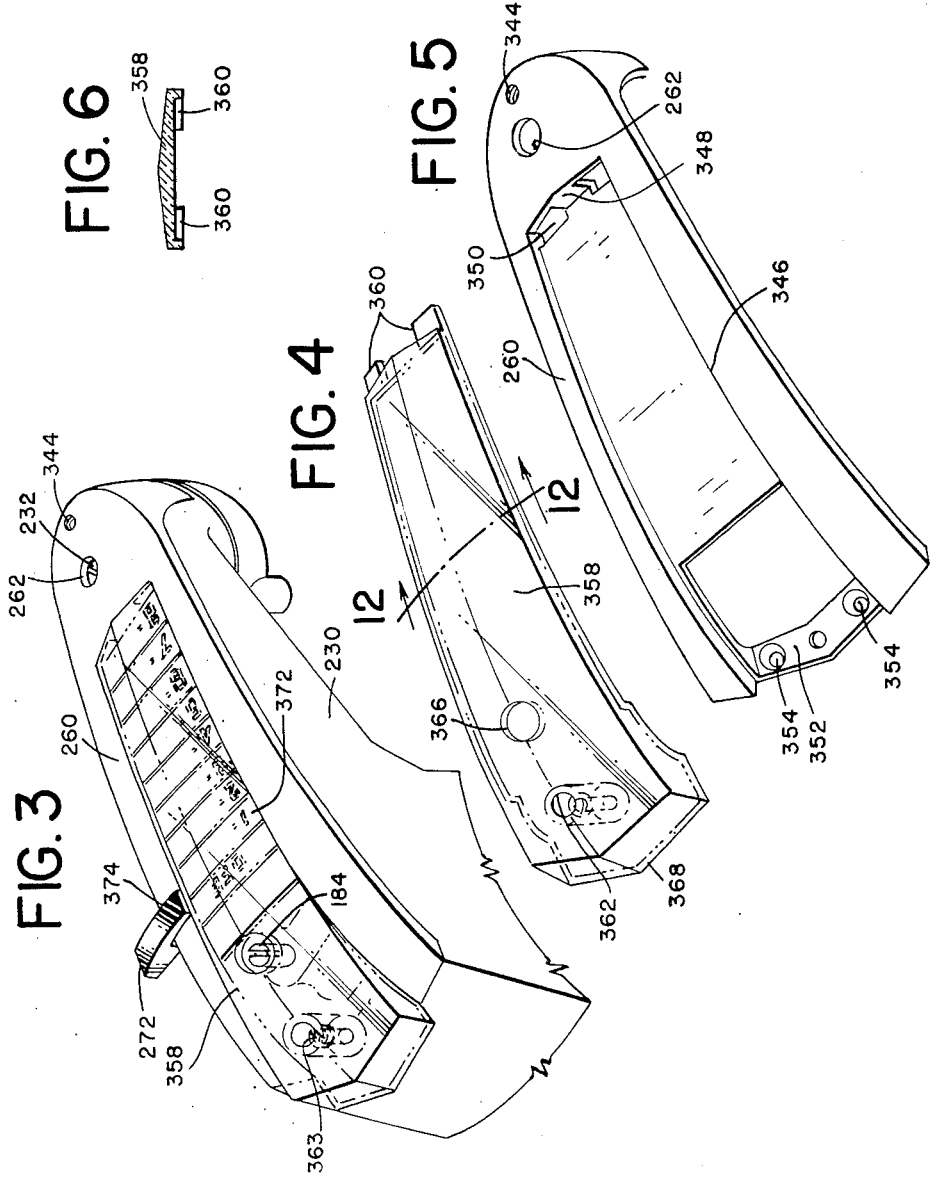
INVENTOR.-
WALTER VAN GUILDER
BY William C. Babcock   ATTORNEY Patented Dec. 15, 1953

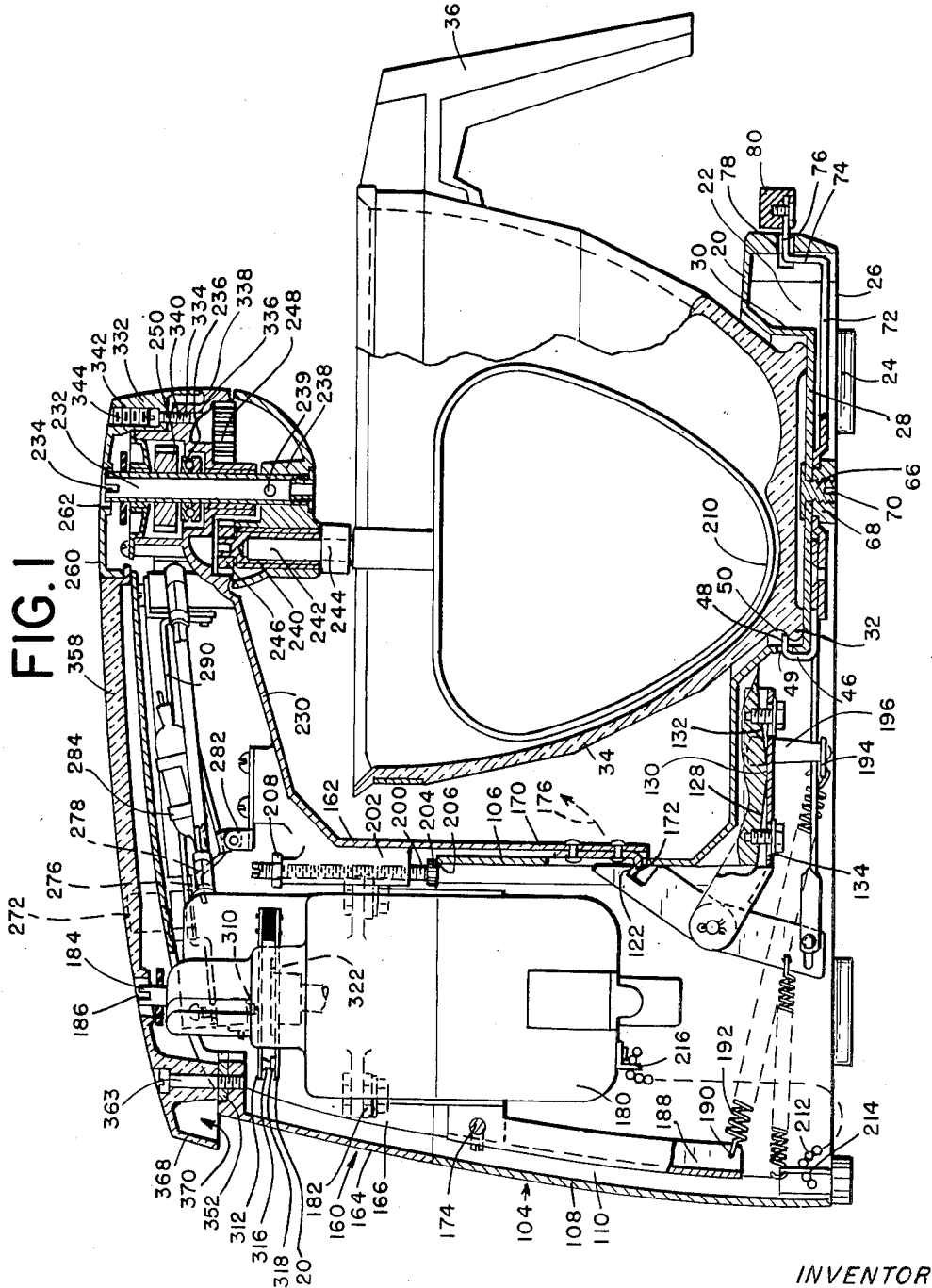

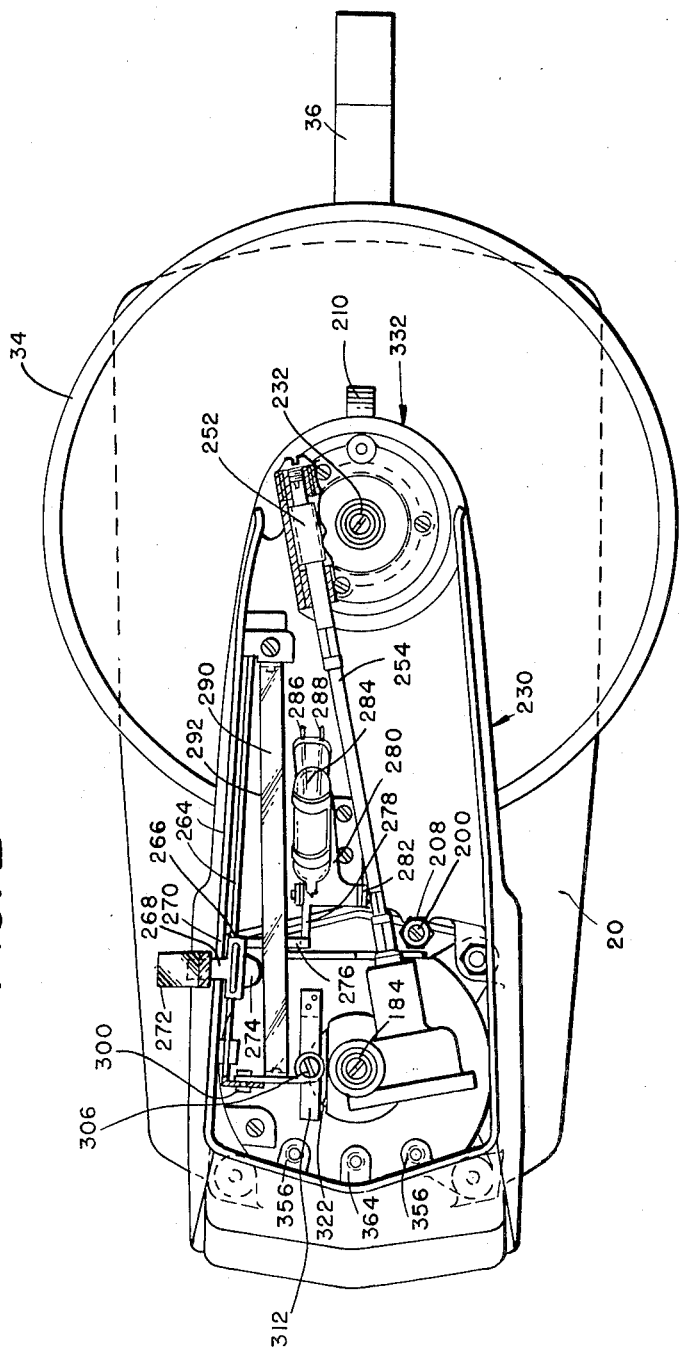

2,662,421

UNITED STATES PATENT OFFICE 2,662,421

FOOD MIXER CASING

Walter Van Guilder, River Forest, Ill., assignor to General Mills, Inc., a corporation of Delaware Original application January 3, 1950, Serial No. 136,572, now Patent No. 2,616,673, dated November 4, 1952. Divided and this application March 1, 1952, Serial No. 274,481

8 Claims. (Cl. 74—606)

1

The present invention relates to food mixers and particularly to improvements in household food mixers of the general type shown in the copending application of John N. Polivka and George T. Scharfenberg, filed January 3, 1950, now U. S. Patent 2,616,674, which is assigned to the same assignee as the present invention The present application is a division of my prior copending application Serial No. 136,572, filed January 3, 1950, for Food Mixer.

This new and improved type of food mixer includes a base, a bowl support at one end of the base, and an upright motor housing mounted at the other end of the base and having a gear casing projecting above the bowl support. The motor housing is movably mounted on the base for movement between operating and retracted positions with respect to the bowl support. In this type of mixer, the motor is mounted within the upright motor housing with the motor axis substantially vertical. Means are provided for urging the housing to retracted position, and a releasable latch is also utilized to hold the housing in operative position.

One object of the present invention is an improved cover construction for an open-sided mixer casing.

A further object is an improved cover construction in which a cover-fastening means is located and arranged to provide a retaining recess for attachment of an accessory to the mixer.

Still another object is an improved mixer casing construction in which a removable cover is provided with a separate insert or cover plate and in which the cover and insert are secured to the mixer housing and casing in novel fashion.

Another object of the invention is the provision of an improved arrangement of parts in a food mixer, designed for simple and economical construction.

Other objects and advantages will be apparent from the following specification in which a preferred form of the invention has been described with particular reference to the accompanying drawings.

In these drawings,

Figure 1 is a side elevation, with certain parts shown in section and certain parts broken away for clearness, showing a food mixer according to the invention.

Fig. 2 is a top view of the mixer with the cover removed, showing details of the governor control mechanism and cover mounting arrangement.

Fig. 3 is a perspective view of the top of the mixer showing the assembled cover in position.

2

Fig. 4 is a perspective view of the removable insert for the cover.

Fig. 5 is a perspective view of the removable cover itself, without the insert, and Fig 6 is a sectional view of the insert on the line 12—12 of Fig. 4.

As shown in Fig. 1, the mixer includes a base 20 provided with a depending peripheral skirt or flange 22. The base is provided with supporting legs 24 of rubber or resilient material for supporting the base 20 with its lower edge 26 spaced slightly above the table or other support in order to provide a ventilation opening beneath the peripheral edge of the base.

At one end of the base is located a bowl support, the circular bottom surface of which is indicated at 28. This bowl support is recessed below the upper surface of base 20 and includes the vertical wall portion 30 between the top of the base and the bottom 28 of the bowl support. Thus a cup-shaped or cylindrical recess is provided which is designed to accommodate the base flange 32 of a suitable mixing bowl 34. Bowl 34 may be provided with a carrying handle 36 for convenience in manipulation.

As shown particularly in the above-mentioned parent application, the bottom of the base 20 beneath bowl support 28 is provided with a plurality of radial slots with sliding clamping members which can clamp or release the bowl.

At the other end of base 20 opposite the bowl support 28, there is a stationary hollow pedestal 104 on which the motor housing is movably mounted. Pedestal 104 includes a front wall 106, a rear wall 108, and side walls 110 and 112 respectively (Fig. 4). Front wall 106 is provided with a latch opening 114. It will be noted that this latch opening is on the side of the pedestal facing the mixing bowl 34, i. e., facing toward what has been termed, for convenience, the "front" of the mixer.

A latch 116 is movably mounted within pedestal 104, and is pivoted at 118 to a latch support 120. The latch includes a retaining hook 122 located just inside the pedestal and in alignment with the latch opening 114.

Above the pedestal 104 is located the movable motor housing 160. This housing includes a front wall 162, the rear wall 164, and side walls 166 and 168. The front and side walls extend downwardly and overlap the corresponding front and side walls of the pedestal 104 as shown in the drawings. Thus, in Fig. 1, the front wall 162 of the housing has a depending skirt 170 which extends in overlapping engagement downwardly along the front wall 106 of pedestal 104 so as to cover and conceal the latch opening 114 when the parts are in the position of Fig. 1. This depending skirt 170 carries the latching projection 172 which extends inwardly through latch opening 114 into engagement with the hook 122 of latch 116 to retain the housing in operating position.

In order to support the housing on the pedestal for movement between its operating and retracted positions, the parts are hinged together by means of a substantially horizontal pivot 174. As shown particularly in Fig. 1, the axis of this pivot 174 is located at the rear of pedestal 104 and housing 160 and is also located substantially higher above base 20 than the height of the latch opening 114. Thus, as the housing 160 tilts upwardly and rearwardly about its axis 174, the latch projection 172 will move upwardly and forwardly away from front wall 106 of the pedestal and into the space between said front wall and the bowl 34, as indicated by arrow 176. This arrangement and relative location of the latch mechanism and the pivot 174 makes it possible for the latch 116 and its associated parts to be located and concealed within the pedestal so that even after the skirt 170 moves upwardly, there are no latch portions projecting from the pedestal 104 for accidental engagement by the user.

Rigidly supported in the movable housing 160 is the motor or power unit 180 which is held in position by bolts 182 engaging suitable flanges on the motor 180 and housing 160. The motor shaft 184 is substantially vertical and is provided at its upper end with a driving slot 186 or other connecting means by which a suitable accessory may be directly driven.

The housing 160 includes a depending lever arm 188, which is connected at its lower end 180 to one or more springs 192. Springs 192 normally urge the lower end of bracket or lever 188 toward the front of the mixer and thus tend to rock the motor housing 160 upwardly and rearwardly from the operative position of Fig. 1 toward retracted position. The parts are held in the operating position of Fig. 1 by the engagement of latching hook 122 with latching projection 172.

Adjustable stop means are provided between the movable housing 160 and pedestal 104 in order to limit the movement of the housing toward the bowl support. In this case, the stop means includes a member 200 which is adjustably threaded in a boss 202 in the movable housing 160. The threaded bolt 200 includes a lower head 204 which engages the upper edge 206 of front wall 106 of pedestal 104 to limit clockwise rotation of the housing with respect to the pedestal as shown in Fig. 1. Above the boss 202 the stop member 200 may be provided with a lock nut 208. Relative adjustment of the stop member 200 will thus accordingly serve as an absolute limit for movement of the housing toward operative position. By suitable adjustment of member 200, engagement of the beater 210 supported by the movable housing against the surface of mixing bowl 34 may be prevented. At the same time, the working clearance of the beater 210 above the lower surface of the bowl 34 may be readily adjusted by vertical adjustment of the latch pivot 118.

Extending longitudinally and forwardly from the upper portion of the movable motor housing 160 is a beater-supporting gear casing 230. This casing extends to a point above the bowl support 28 and supports a vertical power shaft 232 above the bowl support. Shaft 232 includes a slot or other driving connection 234 at its upper end to which an operating accessory may be attached. The power shaft 232 is supported by a thrust bearing 236 in the end of casing 230.

At the lower end of power shaft 232 is a planetary head 238 which is keyed to the shaft by a shear pin 239. A beater drive 240 is rotatable on a vertical axis offset from the power shaft axis 232 in the planetary head 238. This beater drive shaft 240 is adapted for removable engagement with the shaft 242 of beater 210, suitable clamping means 244 being provided to hold the beater 210 in position with the beater shaft in interlocking engagement with the drive shaft 240 in known manner.

A pinion 246 at the upper end of beater drive shaft 240 engages an internal ring gear 248 in the end of gear casing 230 and causes rotation of the beater drive shaft and beater on its own axis at the same same that the beater shaft revolves around the axis of power shaft 232 as a result of movement of planetary head 238.

In order to connect the power shaft 232 to the motor shaft 184, suitable driving connections are located in the upper portion of the housing and casing.

It will be noted that both the motor housing 160 and gear casing 230 are of substantially open-topped construction. A cover 260 is removably mounted on the casing and housing to close the openings at the top thereof. Cover 260 in turn has an opening 262 through which the upper end of power shaft 232 is accessible for driving engagement with a desired accessory.

Also mounted in the casing 230 is suitable controlling mechanism for the governor or speed control device of the motor. A longitudinally extending support or slide 264 extends substantially the length of the casing 230 and serves as a slidable support for a control member 266 (Fig. 2). Control member 266 is slidable longitudinally of the casing on support 264 and includes a projecting arm 268 which extends outwardly through a slot 270 at the meeting line of the casing 230 and cover 260. A manual knob 272 is mounted on the outer end of extension 268 for convenient manipulation by the user. Thus longitudinal movement of knob 272 along the side of casing 230 will cause the control member 266 to slide longitudinally along support 264. Control member 266 includes a speed control cam surface 274 and an on-off lever extension 276. The projection or extension 276 is adapted to engage the actuating arm 278 of a switch support 280 pivoted on a horizontal axis at 282 for tilting movement within the casing. A liquid contact switch 284 is mounted on the switch support 280 and includes leads 286 and 288 connected in the motor circuit in known manner to open and close the circuit depending on the angular position of the liquid contact switch 284. With the manual knob in the position shown in Fig. 2, the extension 276 engages the on-off switch arm 278 and rocks the liquid contact switch 284 to its off position. As soon as the control knob 272 is moved toward the front of the mixer a slight distance, the arm 276 will be disengaged from the lever arm 278 and will permit the switch 284 to rock to its on position, provided the casing and housing are in the operative position of Fig. 1. It will be understood, that in case the housing 160 and casing 230 have been tilted upwardly to their retracted position, the liquid contact switch 284 will be inclined to its off position so that the motor circuit will be broken, even though manual knob 272 is at the forward end of its slide where the motor would normally be in operation.

A speed control member 290 also extends substantially longitudinally of casing 230 and includes a cam or actuating surface 292 which is angularly disposed with respect to the path of movement of control member 266 on slide 264. Speed control member 290 is pivoted on a longitudinal axis and is operatively connected to governor switch means for controlling the speed of the motor as described in the above parent application.

With reference to the cover 260, novel means of attachment of the cover to the casing have been provided. In this case the forward end of the cover includes a substantially thickened portion 332 provided with an opening 334 in substantial alignment with a threaded attaching opening 336 in an attachment boss 338 at the outer end of casing 230. An attaching bolt 340 projects downwardly through the cover opening 334 and is threaded into the recess 336 of boss 338 to retain the cover in position. According to the invention, the outer or upper portion of the passage 334 is substantially countersunk or recessed as shown at 342 in order that the head bolt 340 will be located substantially below the upper surface of cover 260. This countersunk portion 342 is then provided with means for attachment of a suitable accessory to the mixer casing. In this case the particular attaching means includes internal threads 344 in the countersunk portion 342. It will be noted that this countersunk portion is located substantially adjacent the power shaft 232 so that an accessory to be driven by power shaft 232 may readily be held in position by the use of a clamp threaded into the countersunk portion 342.

The cover 260, which is removably mounted on the open-topped housing and casing, includes a longitudinal recess 346, the front edge 348 of which is located just to the rear of the accessory drive opening 262. At the forward edge 348 of recess 346 openings or undercut portions 350 are provided for interfitting engagement with suitable projections on a removable insert described below. The forward end of cover 260 will, of course, be fastened to the casing by the retaining bolt 340 already described. At the rear end of the cover 260 the cross piece 352 is provided with openings 354 through which suitable bolts may be threaded into the attachment bosses 356 (Fig. 2) of the rear wall of the motor housing 160. It will be noted that these openings 354 and the cross piece 352 are substantially below the upper surface of cover 260 so that they may be covered and concealed by the additional removable insert 358 which is mounted in the longitudinal recess 346. This removable insert 358 is preferably of plastic material and includes at its front end projections 360 adapted to interlock with the undercut portions 350 of the cover 260 to retain the forward end of the plastic insert 358 in position. An opening 362 at the rear of the plastic insert provides means for passage of an attaching bolt which may be threaded into the attachment boss 364 in the rear wall of motor housing 160. The removable insert 358 also includes an opening 366 in substantial alignment with the motor shaft so that the motor shaft is accessible through opening 366 for driving engagement with a suitable accessory.

The rear end of the insert 358 extends outwardly at 368 beyond the rear wall of the motor housing 160 in order to provide a handgrip portion by which the mixer may be moved from place to place. This projecting portion 368 also protects and conceals a ventilation opening 370 (Fig. 1) through which air may be introduced into the motor casing for ultimate discharge through the ventilation opening at the lower edge of the base 20.

A suitable scale 372 may be etched on the plastic insert 358 or provided on a separate scale member mounted in the recess 346 beneath the insert. Scale 372 cooperates with a suitable pointer 374 on control knob 272 to indicate the operative condition of the mixer and governor mechanism.

According to the foregoing description, a mixer construction has been provided which offers definite advantages in simplicity, ease of operation, and adaptability to various types of attachments. The mixer includes novel features of construction and improved methods of adjustment which facilitate large scale production of such an item by assembly line methods. The mixer accomplishes the objects set forth at the beginning of the present specification and provides a new and improved utensil for performance of a large number of household functions in a more efficient manner.

Since minor variations and changes in the exact details of construction will be apparent to persons skilled in this field, it is intended that this invention shall cover all such changes and modifications as fall within the spirit and scope of the attached claims.

Now, therefore, I claim:

1. A food mixer comprising an open sided casing having a removable cover, the casing having an attachment boss with a threaded recess, and the cover including a thick section overlying the attachment boss and having a bolt hole aligned with the boss recess, and a bolt passing through the hole and into the threaded recess and thereby retaining the cover in position, the outer portion of the hole being countersunk to locate the bolt below the cover surface, and the countersunk portion including retaining means for attachment of an accessory to the casing.

2. A food mixer according to claim 1 in which the retaining means consists of internal threads in the countersunk portion between the outer end of the bolt and the surface of the cover.

3. A food mixer comprising an open sided casing having a power shaft therein and a removable cover for the casing provided with an opening through which the power shaft is accessible, the casing having an attachment boss with a threaded recess adjacent the power shaft, and the cover including a thick section overlying the attachment boss and having a bolt hole aligned with the boss recess, and a bolt passing through the hole and into the threaded recess and thereby retaining the cover in position, the outer portion of the hole being countersunk to locate the bolt below the cover surface, and the countersunk portion including retaining means for attachment of an accessory to the casing for connection with the power shaft.

4. A food mixer comprising an open topped casing having a vertical power shaft therein and a removable cover for the casing provided with an opening through which the power shaft is accessible, the casing having an attachment boss with a threaded recess adjacent the power shaft, and the cover including a thick section overlying the attachment boss and having a vertical bolt hole aligned with the boss recess, and a bolt passing through the hole and into the threaded recess and thereby retaining the cover in position, the outer portion of the hole being countersunk to locate the bolt below the cover surface, and the countersunk portion including retaining means for attachment of an accessory to the casing for connection with the power shaft.

5. A food mixer comprising a base, an open-topped casing mounted above the base, a removable cover member on the casing having a recess in its upper surface, and a removable insert mounted in the recess, means attaching the cover to the casing and located and concealed beneath the insert, and separate retaining means holding the insert in the recess and fastening the insert directly to the casing.

6. A food mixer according to claim 5 in which th retaining means is located at one end of the insert, the other end of the insert and the corresponding portion of the cover having interlocking portions preventing displacement of that end of the insert until the retaining means is released.

7. A food mixer comprising a base, an open topped motor housing at one end of the base having an open-topped beater supporting casing extending above the other end of the base, a motor in the housing, a vertical power shaft in the casing, driving connections in the housing and casing between the motor and power shaft, a removable cover extending longitudinally over the casing and housing and having an opening aligned with the power shaft, a bolt hole adjacent the power shaft opening, a bolt passing through the hole and secured in the casing, the outer end of the bolt hole being countersunk to locate the bolt below the cover surface and provide a recess for receiving and supporting a corresponding portion of an accessory when the latter is operatively connected to the power shaft, the cover having a longitudinal recess extending toward the power shaft opening from the housing end of the cover, and a removable insert mounted in the cover recess, the cover having a second fastening bolt passing through the recessed cover portion into the housing and concealed beneath the insert, the insert and cover having interlocking retaining portions at their power shaft end, and a third fastening bolt at the other end passing through the insert into the housing.

8. A food mixer comprising a pair of casing members adapted for assembly with each other, one of the casing members having an externally accessible passage, a fastening member extending inwardly through said passage and engaging the other casing member thereby retaining the two casing members in assembled relation with the outer end of the fastening member spaced substantially inwardly along said passage from the outer surface of said one casing member, and separate retaining means in the outer portion of the passage in said one casing member for receiving and removably securing a corresponding portion of an accessory within said passage between the outer end of the fastening member and the outer surface of said one casing member.

WALTER VAN GUILDER.

References Cited in the file of this patent
UNITED STATES PATENTS

| Number | Name | Date |
|---|---|---|
| 2,247,707 | Jordan | July 1, 1941 |